United States Patent Office 3,186,794
Patented June 1, 1965

3,186,794
OXIDATION OF SULPHUR DIOXIDE TO SULPHUR TRIOXIDE AND CATALYSTS THEREFOR
Phineas Davies, Norton-on-Tees, England, assignor to Imperial Chemical Industries Limited, Millbank, London, England, a corporation of Great Britain
No Drawing. Filed Mar. 6, 1964, Ser. No. 350,114
Claims priority, application Great Britain, Aug. 13, 1956, 24,680/56, 24,681/56; Mar. 22, 1957, 9,431/57; Dec. 17, 1958, 40,678/58
24 Claims. (Cl. 23—175)

This application is a continuation-in-part of my applications Serial Nos. 675,541 filed August 1, 1957, now abandoned, and 258,120, filed February 13, 1963. The said application Serial No. 258,120 is a continuation-in-part of my applications Serial Nos. 675,540, filed August 1, 1957, and 855,525, filed November 27, 1959, both now abandoned.

This invention relates to the oxidation of sulphur dioxide to sulphur trioxide, and particularly to the production of catalysts suitable for use in this reaction.

In one of its forms the invention provides a process for the production of catalysts suitable for the oxidation of sulphur dioxide to sulphur trioxide, which comprises the steps of bringing a dissolved or suspended vanadium compound into contact with an aqueous silicate solution, whereby there is obtained a precipitate comprising a vanadium compound and silica, the starting materials employed having been selected so that the said precipitate also contains both sodium and potassium compounds, and then incorporating into the precipitate a quantity of kieselguhr sufficient to make the silica content of the final catalyst from 50% to 65% by weight.

The catalysts produced by the process of the invention in this form preferably have a composition falling within the range

| | Percent by weight |
|---|---|
| $K_2O$ | 5.5–8.0 |
| $Na_2O$ | 1.25–1.75 |
| $V_2O_5$ | 3.5–7.5 |
| $SiO_2$ | 52.5–62.5 |

In one method of preparing the catalysts, a vanadyl sulphate solution is added with continuous stirring to a mixed solution of potassium silicate and sodium silicate. After drying, the gel formed in this way contains both sodium and potassium compounds, the ratio of these being determined by the ratio of potassium silicate to sodium silicate in the mixed solution employed.

As an alternative, a solution of potassium hydroxide is added to a vanadyl sulphate solution, whereby a blue gelatinous suspension is formed. This suspension is added to an aqueous solution of sodium silicate. This method can also be carried out in the reverse manner, that is, using sodium hydroxide in place of potassium hydroxide, and potassium silicate in place of sodium silicate, but this is less convenient because potassium silicate is less readily available than sodium silicate.

In order to obtain catalysts having suitable compositions by the process of the invention in this form, it is necessary to introduce kieselguhr: the $SiO_2$ content would be too low in comparison with the $Na_2O+K_2O$ content, if the whole of the $SiO_2$ had been introduced by the use of alkali metal silicates. Thus it is a feature of the invention in this form that the precipitate comprising vanadium compound, silica, and sodium and potassium compounds has an additional quantity of kieselguhr incorporated into it. This is conveniently done by suspending the said precipitate in water and adding a suspension of kieselguhr, for example, that sold under the trade name "Celite" 519A.

The properties of the catalyst are improved by treating the product, produced as described above, with sulphuric acid prior to use. For this purpose, a solution containing 10% by weight $H_2SO_4$ is suitable. The acid is added to the product, preferably in an amount just sufficient to ensure that it is wet throughout, and the mixture is stirred.

The catalyst material prior to use is preferably dried. This is conveniently carried out by spreading out the material on trays and heating it at a temperature in the range of 100 to 120° C. The material is then preferably calcined at a temperature in the range of 300 to 400° C. prior to use.

Vanadium compounds which may be used in the process of the invention in this form are, for example, vanadyl chloride, vanadyl oxalate, ammonium vanadate and vanadyl sulphate.

The invention in this form also provides a process for the oxidation of sulphur dioxide to sulphur trioxide by contacting the former in the presence of a gas containing free oxygen with a catalyst, produced as hereinbefore disclosed, at an elevated temperature of at least 380° C.

When using the catalysts produced by the invention in this form a higher conversion of sulphur dioxide to sulphur trioxide is obtained than when using catalysts produced according to previously known methods. In Examples 1 and 2 given below, results are given for the oxidation of sulphur trioxide of a gas comprising 6% by volume of sulphur dioxide in a nitrogen-oxygen mixture, such as air. A gas mixture of this type is suitable on an industrial scale for use in the conversion of sulphur dioxide to sulphur trioxide.

EXAMPLE 1

53.1 mls. of a vanadyl sulphate solution containing the equivalent of 11.2 grams $V_2O_5$ were added with continuous stirring to a solution of 23.4 grams of sodium silicate (9.4% by weight $Na_2O$ and 30.1% by weight of $SiO_2$) and 131 grams of potassium silicate (11.3% by weight $K_2O$ and 22.7% by weight $SiO_2$) in 200 mls. of water. To the gel formed water was added to render the gel fluid and 95 grams of the siliceous material sold under the trade name "Celite" 519A were added together with a further 600 mls. of water. The gel was dried at 120° C. and treated with sulphuric acid. It was redried at 120° C. and calcined at 300° C. The composition of the final catalyst was as follows:

| | Percent by weight |
|---|---|
| $K_2O$ | 6.8 |
| $Na_2O$ | 1.6 |
| $V_2O_5$ | 5.4 |
| $SO_3$ | 19.2 |
| $SiO_2$ | 57.3 |
| $Al_2O_3$ | 1.0 |

A catalyst prepared in this manner was tested in the oxidation of sulphur dioxide to sulphur trioxide using a gas comprising by volume 6% sulphur dioxide, 7% oxygen and 87% nitrogen. The gas was passed over the catalyst at a space velocity of 2,500 litres per hour per litre of catalyst-filled space. The percentages of sulphur dioxide converted to sulphur trioxide at temperatures in the range of 380° C. to 470° C. are given in Table 1 below.

Another sample of the catalyst was treated for 26 hours at 650° C. with a gas comprising by volume 6% sulphur dioxide, 7% oxygen and 87% nitrogen. A treatment of this type is said to "stabilize" the catalyst, that is, to confer upon it the activity when the catalyst would possess after prolonged use in a sulphur dioxide oxidation process. A sample of "stabilized" catalyst was then tested using the procedure already described. The results obtained are also given in Table 1, in which, for comparison, results obtained using a conventional sulphur dioxide oxidation catalyst are included.

Table 1

| Operating temperature, °C. | Percent SO₂ converted using catalyst produced as described above | | Percent SO₂ converted using conventional catalyst | |
|---|---|---|---|---|
| | As prepared | After "stabilization" | As received | After "stabilization" |
| 380 | 12 | 8 | 9.5 | 7.5 |
| 400 | 31 | 18 | 17 | 14.5 |
| 420 | 56.5 | 48 | 42 | 35 |
| 440 | 82.5 | 72 | 75 | 62.5 |
| 460 | 88.5 | 82 | 84 | 78 |
| 470 | 89.0 | 83.5 | 86 | 81 |

EXAMPLE 2

An aqueous solution of 17.6 gm. of potassium hydroxide was added to 53.1 mls. of a vanadyl sulphate solution containing the equivalent of 11.2 gms. $V_2O_5$ to give a blue gelatinous suspension at a pH of 3. This was added to a solution of 23.4 gms. sodium silicate in 250 mls. water. To the brown suspension obtained, 123.8 grams of the siliceous material sold under the trade name "Celite" 519A, suspended in 300 mls. water, were added. The gel obtained had a pH of 8. It was dried and treated as described in Example 1. It had the following analysis:

|  | Percent by weight |
|---|---|
| $K_2O$ | 5.7 |
| $Na_2O$ | 1.6 |
| $V_2O_5$ | 5.2 |
| $SO_3$ | 17.7 |
| $SiO_2$ | 57.2 |
| $Al_2O_3$ | 1.3 |

The catalyst produced as described above was tested as already described in Example 1. The results are given in Table 2 below.

Table 2

| Temperature, °C. | Percent SO₂ converted | | Percent SO₂ converted using convential conventional catalyst | |
|---|---|---|---|---|
| | Catalyst as prepared | "Stabilized" catalyst | As received | After "stabilization" |
| 380 | 12 | 10 | 9.5 | 7.5 |
| 400 | 25 | 19 | 17 | 14.5 |
| 420 | 56 | 51 | 42 | 35 |
| 440 | 81.5 | 76 | 75 | 62.5 |
| 460 | 87.5 | 83 | 84 | 78 |
| 470 | 87.5 | 85 | 86 | 81 |

A second embodiment of the invention provides a process for the production of catalysts suitable for use in the oxidation of sulphur dioxide to sulphur trioxide, in which a freshly prepared silica gel containing sodium and/or potassium ions is impregnated with a freshly precipitated vanadium pentoxide containing sodium and/or potassium ions, the product being dried, contacted with sulphuric acid, and thereafter calcined prior to use, the compositions and proportions of the reactants being chosen so that the finished catalyst comprises silica, 6 to 9% by weight of vanadium pentoxide, 6 to 10% by weight of potassium oxide and 1.5 to 6% by weight of sodium oxide and preferably 8 to 10% of potassium oxide and 3 to 4% of sodium oxide.

As disclosed above, the silica gel employed in the process of this second embodiment of the invention should be freshly prepared. By this it is meant that the silica gel after precipitation should be employed in the impregnation step before it has been allowed to dry out. Preferably the silica gel is employed immediately after precipitation, in which case it will have had no opportunity of becoming dry. If, however, it is necessary for several hours or even a few days to elapse between precipitating the silica gel and impregnating this with the freshly precipated vanadium pentoxide, the silica gel is preferably stored in an unfiltered state and under conditions such that there is no appreciable loss of water. It may then be filtered immediately prior to use.

Preferably, in the process of this second embodiment of the invention, a freshly prepared silica gel containing sodium ions is impregnated with a freshly precipitated vanadium pentoxide containing potassium ions.

It is a further preferred feature of this second embodiment of the invention that the silica gel containing sodium ions is produced by adding ammonium sulphate to an aqueous solution of sodium silicate. The sodium ion content of the gel so produced is adjusted to the desired value by washing the gel with water, the actual value being dependent upon the desired sodium oxide content of the final catalyst. The silica gel so produced may be impregnated with oxides of vanadium and potassium in the following manner. Vanadic acid is dissolved in aqueous potassium hydroxide, or in a mixed aqueous solution of potassium hydroxide and sodium hydroxide. Sulphuric acid is then added to this solution, whereby a red precipitate is formed. The liquor containing this precipitate, and silica gel containing sodium ions, produced as described above, are then slurried together, the product is evaporated to a paste of thick consistency, and this paste is finally dried and preferably ground to a powder.

In place of ammonium sulphate other salts may be used such as acetates, for example ammonium acetate, sodium acetate and magnesium acetate; carbonates and bicarbonates, for example, ammonium bicarbonate, sodium carbonate; sulphates, for example aluminum sulphate; and chlorides, for example, ammonium chloride, sodium chloride, calcium chloride. When using precipitating agents, such as for example, chlorides, there is a danger of introducing chloride ions into the final catalyst, and these may have a deleterious effect on the catalyst activity. It is therefore not generally desirable to use precipitating agents which tend to introduce undesirable ions into the catalyst.

The silica gel containing sodium ions may also be produced from sodium silicate by the addition of an alkali, such as ammonia, or an acid, such as sulphuric acid. Thus, aqueous sulphuric acid may be added to an aqueous solution of sodium silicate, to give a silica gel containing sodium ions. The amount of sulphuric acid employed should be such that the final pH is not less than 8. The sodium ion concentration in the gel is, in general, adjusted to a desired value by washing. As previously described, a red precipitate is produced in a second vessel by dissolving vanadic acid in an aqueous solution of potassium hydroxide or in a mixed aqueous solution of potassium hydroxide and sodium hydroxide and subsequently adding sulphuric acid. On slurrying together the silica gel and the red precipitate and subsequently drying the product, there is obtained a silica gel impregnated with compounds of potassium, sodium and vanadium.

By using ammonium sulphate instead of a mineral acid such as sulphuric acid as the precipitant for silica gel from sodium silicate, the precipitated gel is obtained in a form in which it is more readily filtered and washed, and in which, in consequence, its sodium ion content may be readily adjusted to the desired value.

The material comprising silica, vanadium pentoxide, potassium oxide and sodium oxide, produced for example as described above, is then dried. This may be carried out for example by removing supernatant water by evaporation and then by spreading the partially dried paste on trays which are then heated to a temperature of 100 to 120° C. The dry product is then treated with aqueous sulphuric acid. This treatment is conveniently carried out by mixing the powder with acid containing about 10% by weight $H_2SO_4$; the amount of acid is preferably just sufficient to wet the powder and thorough mixing should be ensured, for example by vigorous stirring. In general, it is convenient in this treatment to use about 1 litre of 10% by weight sulphuric acid for each kilogram of final catalyst. The treated product is then calcined prior to use. If desired, it may be redried before being calcined. The drying may, for example, be carried out as before by spreading the material on trays and heating it at a temperature in the range of 100 to 120° C. The calcination may be carried out in a similar manner by heating the material at a temperature in the range 300° C. to 400° C. The material after calcination may be pelleted prior to use; for example it may be pelleted into the form of cylinders, 3/16" high and 3/16" in diameter. It will be understood that if it is desirable to use the catalyst in the form of a powder in, for example, the oxidation of sulphur dioxide to sulphur trioxide in the fluidized state, the catalyst may be introduced into the converter as a powder prior to the calcination step, and the calcination step carried out in situ in the converter.

The activity of the catalysts of the present invention may be increased by treating them in air for six to twelve hours at an elevated temperature of the order of 550° C.

As another feature of this second embodiment of the present invention, the silica gel may be treated after production with a washing liquid containing an alkaline earth metal hydroxide. Thus, we have found that by treating the silica gel with lime or baryta water before impregnation with vanadium and potassium compounds, there is obtained a catalyst having a high activity in sulphur dioxide oxidation, and this activity is maintained after prolonged use. Catalysts prepared in this manner using lime water or baryta water as the washing liquid prove on analysis to contain a small amount of one or more calcium or barium compounds.

Additional quantities of silica may be introduced into the catalysts of the present invention by incorporating kieselguhr, such as that sold under the trade name "Celite" 591A, into the dried gel after impregnation. This additional silica increases the porosity of the catalyst. In general, the quantity of additional silica incorporated in this manner should not exceed 10% of the total catalyst weight.

It is a further feature of the present invention that the catalysts may be used in the oxidation of sulphur dioxide to sulphur trioxide, higher conversions being obtained than with catalysts previously proposed for the reaction. This advantage is particularly evident over the temperature range of 380° C. to 460° C. Thus, the catalysts of the present invention have the important advantage of showing high activities at relatively low operating temperatures. It should be noted that, from considerations of equilibrium, such temperatures are preferably employed in the oxidation of sulphur dioxide to sulphur trioxide.

The optimum sodium oxide content of catalysts of the present invention depends upon the temperature at which the catalyst is to be employed. Thus, when the sulphur dioxide oxidation reaction is carried out at 400° C., it is desirable for the sodium oxide content to be from 3.0 to 4.0% by weight. If, for example, a sodium oxide content of 1.5% is employed, the catalyst activity is less than half of that of a catalyst containing 3 to 4% by weight of sodium oxide. On the other hand, if the catalyst is to be employed at a temperature of 500° C., low sodium oxide contents, for example, 1.5% by weight, are preferable, whereas high sodium oxide contents such as, for example 6% by weight, give rise to a decreased catalyst activity.

EXAMPLE 3

(a) 300 mls. of 10% by weight sulphuric acid were added to 434 grams of a sodium silicate solution containing 9.4% by weight of $Na_2O$ and 30.1% by weight of $SiO_2$ diluted with 500 mls. water. The gel obtained was slurried with 2 litres of water and separated by decantation. This slurrying process was repeated four times.

(b) 17 grams of vanadic acid were added to a solution of 24 grams of potassium hydroxide and 1.0 gram of sodium hydroxide in 100 mls. of water. To this solution was added sulphuric acid containing 32.2 grams $H_2SO_4$ and 100 mls. water.

(c) The red suspension produced as described in paragraph (b) was added to the silica gel produced as described in paragraph (a) and the mixture was slurried for 2 hours. It was then heated and slurried for a further hour to complete the impregnation. The product was dried and subsequently treated with sulphuric acid prior to use. The final catalyst had the following percentage composition:

| | Percent by weight |
|---|---|
| $K_2O$ | 9.6 |
| $Na_2O$ | 5.0 |
| $V_2O_5$ | 7.2 |
| $SO_3$ | 22.2 |
| $SiO_2$ | 48.2 |

(d) A sample of the catalyst produced as described above was treated with air for 9 hours at a temperature of 550° C.

(e) A further sample of the catalyst, after treatment according to (d), was treated at 650° C. for 26 hours with a gas containing by volume 6% sulphur dioxide, 7% oxygen and 87% nitrogen. A catalyst treated in this manner is said to be "stabilized"—that is, to have the activity of a catalyst which has been operated for a long period in sulphur dioxide oxidation. In general, this "stabilization" treatment is carried out using a gas of the composition stated for one or more periods of the order of 18 to 24 hours at a temperature of the order of 650° C.

(f) A sample of the catalyst produced as in paragraphs (a), (b), and (c) was tested in the oxidation of sulphur dioxide to sulphur trioxide, using a gas containing by volume 6% sulphur dioxide, 7% oxygen and 87% nitrogen. The gas was passed over the catalyst at a space velocity of 2,500 litres per hour per litre of catalyst-filled space. The conversions obtained at the various temperatures employed are given in column I of Table 3 below. In column II, results are given for a catalyst treated as in paragraph (d) above, while column III gives results for a catalyst "stabilized" as described in paragraph (e). Column IV gives results for a commercial sulphur dioxide oxidation catalyst.

Table 3

| Temperature, °C. | Conversions of $SO_2$ to $SO_3$ | | | |
|---|---|---|---|---|
| | I | II | III | IV |
| 380 | 26.5 | 30.0 | 17.5 | 5.5 |
| 400 | 38.5 | 47.0 | 33.0 | 11.5 |
| 420 | 52.5 | 60.0 | 54.0 | 22.0 |
| 440 | 64.5 | 70.0 | 69.5 | 44.0 |
| 460 | 70.5 | 76.5 | 76.5 | 65.5 |
| 480 | 74.5 | 80.0 | 81.0 | 75.5 |
| 500 | 78.0 | 82.0 | 83.5 | 80.5 |

EXAMPLE 4

434 grams of sodium silicate were diluted with 500 mls. of water and the solution was thoroughly mixed. 82 grams of ammonium sulphate dissolved in 220 mls. of water were added in a steady stream with thorough mixing. A white precipitate was formed which after further stirring for a few minutes set to a gel: this was slurried with water and filtered until the sodium content of the gel (expressed as $Na_2O$) on a dry basis was between 4% and 6% by weight.

17 grams of vanadic acid were dissolved in 100 mls. of a solution containing 1 gram of sodium hydroxide and 24 grams of potassium hydroxide. 33.2 grams of 98% by weight sulphuric acid in 100 mls. water were then added to this solution. A reddish precipitate was formed.

The liquid, including this reddish precipitate, was thoroughly mixed with the silica gel, produced as described above, for 15 minutes. The resulting slurry was then evaporated, while constantly being stirred, to a thick consistency, and was finally dried at 120° C. The dry powder was ground to pass through a 12 B.S.S. sieve and was then treated with sufficient 10% by weight sulphuric acid to produce a homogeneous moist paste. The paste was dried at 120° C. and calcined at 300° C. for four hours, after which it was pelletted. The final product had the following analysis (calculated to 100% total).

| | Percent by weight |
|---|---|
| $K_2O$ | 9.6 |
| $Na_2O$ | 3.8 |
| $V_2O_5$ | 7.9 |
| $SO_3$ | 19.2 |
| $SiO_2$ | 59.5 |

Three samples of the catalyst produced as described above were tested in the oxidation of sulphur dioxide to sulphur trioxide. One of these samples (A) was tested without further treatment. The second (B) was calcined in air at 550° C. for eight hours. The third (C) was "stabilized" by treatment at 650° C. with reaction gas having a composition as described in Example 1 for three periods of approximately 18 hours each.

The activity of the catalysts was determined as in Example 1. The percentage conversions of sulphur dioxide to sulphur trioxide at temepratures in the range of 380° C. to 500° C. are given in the Table 4 below. This table also includes the results for a commercial sulphur dioxide oxidation catalyst.

*Table 4*

| Temperature, °C. | Percentage conversion using catalyst | | | Commercial $SO_2$ oxidation catalyst |
|---|---|---|---|---|
| | (A) | (B) | (C) | |
| 380 | 23.5 | 22 | 12.5 | 5.5 |
| 400 | 36 | 37.5 | 24 | 11.5 |
| 420 | 54 | 58 | 52 | 22 |
| 440 | 68 | 71.5 | 70.5 | 44 |
| 460 | 74.5 | 78 | 77.5 | 65.5 |
| 480 | 77.5 | 80.5 | 80 | 75.5 |
| 500 | 79.5 | 81 | 81.5 | 80.5 |

The invention in a third form provides a process for the production of catalyst suitable for the oxidation of sulphur dioxide to sulphur trioxide which comprises the steps of forming a silica gel from an aqueous sodium-potassium silicate solution, the said gel containing sodium and potassium ions, and incorporating in the said silica gel a vanadium compound, substantially the whole product being dried by heating and thereafter more strongly heated, the compositions and proportions of the reactants being chosen so that the finished catalyst comprises silica, 6 to 10% by weight of vanadium pentoxide, 6% to 15% by weight of potassium oxide, 1.5% to 6% by weight of sodium oxide and 10% to 30% by weight of sulphur trioxide. Preferably the finished catalyst comprises 6 to 10% by weight of vanadium pentoxide, 9% to 12.5% potassium oxide, 4% to 6% of sodium oxide and 15% to 25% by weight of sulphur trioxide.

In carrying out the catalyst production by the invention in this third form, the formation of the silica gel from the sodium-potassium silicate solution is effected by the addition of a suitable gelling agent. The vanadium compound, either in the form of a dissolved salt or a finely divided precipitate, is added either simultaneously with the gelling agent or subsequently or partly simultaneously and partly subsequently.

The gelling agent should be a substance which does not contain such quantities of sodium and/or potassium as would bring the composition of the catalyst outside the specified limits. If such quantities of sodium and/or potassium were introduced it would be necessary to remove them by washing and this would nullify one of the advantages which results from using a mixed sodium-potassium silicate solution as starting material. The gelling agent should thus be a substance which is volatilizable and hence can be largely removed in the heat treatment stages. Especially suitable gelling agents have been found among water-soluble oxy-acids and mixtures thereof which are volatilizable under the conditions of producing the catalysts and water soluble ammonium oxy compounds and mixtures thereof which are volatilizable under the conditions of producing the catalysts and mixtures containing at least one of such oxy acids and at least one of such ammonium compounds. Chloride ions are among the commonest substances which have a poisoning effect on vanadium sulphur dioxide oxidation catalysts hence acids and ammonium salts containing or giving rise to chloride ions are not among the preferred gelling agents for use in the process of the invention. As examples of acids which may be used there may be mentioned sulphuric acid, acetic acid and oxalic acid. As examples of ammonium compounds which may be used there may be mentioned ammonium sulphate, ammonium acetate, ammonium carbonate, ammonium bicarbonate and ammonium hydroxide. The preferred gelling agent is ammonium sulphate. The quantity and composition of the gelling agent used should preferably be such that the pH at all stages of the gelling process is at least 7.0 and more preferably at least 8.0.

When using that embodiment of this third form of the process of the invention wherein the vanadium compound is incorporated in the silica gel after the formation of said gel from the silicate solution, the silica gel should be used preferably while still fresh. By this it is meant that the silica gel should be used before any part of it has been allowed to dry to any extent and preferably before appreciable syneresis, resulting in the separation of more than 10% of the liquid, has taken place. When the vanadium compound is incorporated in this manner the pH in the incorporation stage may be allowed to fall to values well on the acid side of neutrality, for example to pH 1.0, without serious deteriment to the value of the final catalyst produced.

In the preferred mode of carrying out the invention in this third form the vanadium compound is incorporated simultaneously with the gelling agent, the preferred vanadium compound being vanadyl sulphate. For instance a sodium-potassium silicate solution containing 3.5% by weight of $K_2O$, 1.5% by weight of $Na_2O$ and 16.8% of $SiO_2$ has been employed; to this solution was added a solution containing ammonium sulphate and vanadyl sulphate. The final catalyst produced has a $K_2O:Na_2O$ weight ratio of 2.2:1. When the vanadium compound is incorporated simultaneously with the gelling agent the gelling process should also preferably be carried out and completed at a pH of at least 7.0 and preferably of at least 8.0.

The vanadium-containing silica gel, comprising also potassium oxide and sodium oxide, which is produced by the gelation process in the form of a paste, is dried substantially without and preferably entirely without removal of liquid water or of dissolved substances for instance by filtration or decantation or washing. Drying is carried out for instance on trays at a temperature preferably in the range of 100° C. to 200° C. The dried material is a friable solid. Before the next heat treatment it is preferably treated with 10 to 25% of its weight of sulphuric acid (calculated as $H_2SO_4$). This treatment is conveniently carried out by mixing the material with acid containing about 10% by weight $H_2SO_4$; the amount of acid is conveniently just sufficient to wet the material and thorough mixing should be ensured, for example by vigorous stirring in order to break down any large particles. In general, it is convenient in this treatment to use about 1 litre of 10% by weight sulphur acid for each kilogram of final catalyst.

The second heat treatment, in which the product is more strongly heated, is carried out as follows.

The product obtained by the sulphuric acid treatment is treated by one of two alternative procedures, the first of which is preferred: (a) It is dried preferably at a temperature in the range of 100° C. to 200° C. The material preferably after pulverization may then be pelleted or otherwise formed into pieces and is then calcined at a temperature of the order of 550° C. and preferably in the range 500° C. to 575° C.; or (b) the material is heated at a temperature in the range 200° C. to 300° C. and may then be pelleted or otherwise formed into pieces. The product which has not received the sulphuric acid treatment is treated by similar procedure except that the drying stage of procedure (a) is omitted. Again procedure (a) is preferred.

The vanadium compounds used in this third form of the invention must, like the gelling agent, not contain such quantities of sodium and/or potassium as would bring the composition of the catalyst outside the specified limits. Preferably any cations in the vanadium compounds other than cations which contain vanadium are of the type which are removed in the drying or calcination stages. In consequence, the preferred vanadium compounds are soluble vanadyl oxy-salts, such as vanadyl sulphate, oxalate and acetate, and ammonium vanadate. It is also possible to employ a suspension of vanadium pentoxide in sulphuric acid. Like the gelling agent the vanadium compounds used should not contain or give rise to chloride ions.

It is a further feature of the process of this third form of the invention that the catalysts may contain silica additional to that introduced from the aqueous sodium-potassium silicate solution. For example, it is possible to incorporate an amount of kieselguhr, such as that sold under the registered trademark "Celite" 519A. Such additional silica is preferably less than 20% of that introduced from the aqueous sodium-potassium silicate solution and is preferably added to the silicate solution before the gelling stage.

By producing the catalysts by the process according to this third form of the invention, whereby substantially no liquid water or dissolved substances are removed from the silica gel before drying, the $Na_2O:K_2O$ ratio in the final catalyst is fixed by the ratio of these substances in the silicate starting material and hence may be controlled accurately and reproducibly. Furthermore, the process does not involve time-consuming washing and filtration steps. A stiff product is obtained in the gelling stage which is particularly suitable for direct drying without being submitted to a prior evaporation process.

As a further feature of this third form of the invention a process is provided for the oxidation of sulphur dioxide to sulphur trioxide, by passing sulphur dioxide in admixture with a gas containing free oxygen through a bed of catalyst obtained according to the present invention. The catalysts have the advantage of displaying a high activity at temperatures which, from considerations of equilibrium favour a high sulphur dioxide conversion.

EXAMPLE 5

An aqueous sodium-potassium silicate solution was produced which contained:

| | Percent by weight |
|---|---|
| $K_2O$ | 3.5 |
| $Na_2O$ | 1.5 |
| $SiO_2$ | 16.8 | and had a specific gravity of 1.177.

100 kilograms of this silicate solution were gelled by the addition of 5.67 kilograms of ammonium sulphate dissolved in 8.4 litres of water. The mixture was continuously stirred, the addition of ammonium sulphate taking 1½ minutes. Gelation was complete after a further minute. The final pH was between 9 and 10 to Universal Indicator Paper. After letting the gel stand for five minutes, 11.6 litres of vanadyl sulphate, containing 206 grams $V_2O_5$ per litre, were added quickly to the gel with continuous stirring. The stirring was continued until impregnation was complete, this taking about five minutes, and the thick slurry was then dried at 100° C. to 120° C. After the drying stage, which took about 16 hours, the dried product was broken down to pass a 12 B.S.S. sieve and was then treated with 12 litres of sulphuric acid containing 10% by weight $H_2SO_4$. This quantity of sulphuric acid was just sufficient to moisten the dried material. The moistened product was redried at 100° C. to 120° C. and then pelleted and calcined at 500° C. for six hours.

The catalyst obtained had the following analysis:

| | Percent by weight |
|---|---|
| $K_2O$ | 11.0 |
| $Na_2O$ | 5.0 |
| $V_2O_5$ | 7.2 |
| $SO_3$ | 19.0 |
| $SiO_2$ | 53.4 |

The catalyst was tested in the oxidation of sulphur dioxide by passing a gas mixture comprising 6% $SO_2$, 7% $O_2$ and 87% $N_2$ over the catalyst at a space velocity of 2,500 litres per litre of catalyst-filled space per hour. The sulphur dioxide conversions were 33% at 400° C. and 82% at 500° C.

The catalyst was then operated at 650° C. for 24 hours using the same reaction gas. By treating the catalyst in this manner, it acquires the characteristics of a catalyst which has been operated for a prolonged period, for example several months, at a temperature in the range of 400° C. to 500° C. After this treatment, the sulphur dioxide conversion was 36% at 400° C. and 81% at 500° C.

EXAMPLE 6

An aqueous sodium-potassium silicate was produced which contained

| | Percent by weight |
|---|---|
| $K_2O$ | 4.0 |
| $Na_2O$ | 2.1 |
| $SiO_2$ | 16.1 |

100 kilograms of this solution were gelled by the addition of 7.6 litres of an aqueous solution containing 5.67 kilograms of ammonium sulphate and 2.39 kilograms of $V_2O_5$ in the form of vanadyl sulphate. The final pH was between 8 and 8.5 to Universal Indicator Paper. The gel was dried and treated as described in Example 1.

The catalyst obtained had the following analysis:

| | Percent by weight |
|---|---|
| $K_2O$ | 12.4 |
| $Na_2O$ | 5.4 |
| $V_2O_5$ | 8.8 |
| $SO_3$ | 20.9 |
| $SiO_2$ | 49.3 |

The catalyst was then tested as described above. The sulphur dioxide conversions were as follows:

| Temperature: | Conversion, percent |
|---|---|
| 380° | 17 |
| 400° | 33 |
| 420° | 54 |
| 440° | 72 |
| 460° | 79 |
| 480° | 82.5 |
| 500° | 83 |

The catalyst was then heated at 650° C. in reaction gas for 24 hours. On re-testing, conversions were substantially the same as those given in the table above.

I claim:

1. A process for the production of catalysts suitable for the oxidation of sulphur dioxide to sulphur trioxide, which consists essentially of admixing a vanadium salt selected from the group consisting of vanadyl and vanadate salts in aqueous medium with an aqueous solution of sodium and potassium silicates, collecting the precipitate containing a vanadium compound and silica, admixing therewith a quantity of kieselguhr and drying the resulting mixture to form a product consisting essentially of the catalyst having the analysis within the ranges:

|  | Percent by weight |
|---|---|
| $K_2O$ | 5.5–8.0 |
| $Na_2O$ | 1.25–1.75 |
| $V_2O_5$ | 3.5–7.5 |
| $SiO_2$ | 52.5–62.5 |

2. A process as claimed in claim 1 in which a solution of potassium hydroxide is added to a vanadyl sulphate aqueous solution whereby a gelatinous suspension is formed and this suspension is then added to an aqueous solution of sodium silicate.

3. A process as claimed in claim 1 in which kieselguhr is incorporated into the catalyst by suspending the material comprising a vanadium compound, silica and sodium and potassium compounds in water and adding to it a suspension of kieselguhr in water.

4. A process as claimed in claim 1 in which the catalyst material prior to use is contacted with an aqueous solution containing 10% by weight $H_2SO_4$.

5. A catalyst for the production of sulphur trioxide which comprises the product prepared by a process which consists essentially of admixing a vanadium salt selected from the group consisting of vanadyl and vanadate salts in aqueous medium with an aqueous solution of sodium and potassium silicates, collecting the precipitate containing a vanadium compound and silica, admixing therewith a quantity of kieselguhr and drying the resulting mixture, the product being said catalyst which has the analysis:

|  | Percent by weight |
|---|---|
| $K_2O$ | 5.5–8.0 |
| $Na_2O$ | 1.25–1.75 |
| $V_2O_5$ | 3.5–7.5 |
| $SiO_2$ | 52.5–62.5 |

6. A process for the production of catalysts suitable for use in the oxidation of sulphur dioxide to sulphur trioxide, which comprises impregnating a freshly prepared silica gel containing alkali metal ions selected from the group consisting of sodium ions and potassium ions with freshly precipitated vanadium pentoxide containing alkali metal ions selected from the group consisting of sodium and potassium ions, the resulting impregnated product containing both sodium and potassium ions, drying the product thus formed, contacting it with sulphuric acid, and thereafter calcining it prior to use, the compositions and proportions of the reactants being chosen to produce the finished catalyst which comprises silica, 6 to 9% by weight of vanadium pentoxide, 6 to 10% by weight of potassium oxide and 1.5 to 6% by weight of sodium oxide.

7. A process as claimed in claim 6 in which the finished catalyst comprises 8 to 10% by weight of potassium oxide to 3 to 4% by weight of sodium oxide.

8. A process as claimed in claim 6 in which, prior to use, the final catalyst is treated in air for 6 to 12 hours at an elevated temperature of the order of 550° C.

9. A process as claimed in claim 6 in which the silica gel after production but before impregnation is treated with a washing liquid containing an alkaline earth metal hydroxide.

10. A process as claimed in claim 6 in which kieselguhr is introduced into the dry gel after impregnation, the amount being such that the quantity of additional silica incorporated in this manner is at most 10% of the total catalyst weight.

11. A process for the production of catalysts suitable for use in the oxidation of sulphur dioxide to sulphur trioxide which comprises impregnating a freshly prepared silica gel containing sodium ions with a freshly precipitated vanadium pentoxide containing potassium ions, drying the product thus formed, contacting it with sulphuric acid, and thereafter calcining it prior to use, the compositions and proportions of the reactants being chosen to produce the finished catalyst which comprises silica, 6 to 9% by weight of vanadium pentoxide, 6 to 10% by weight of potassium oxide and 1.5 to 6% by weight of sodium oxide.

12. A process as claimed in claim 11 in which the silica gel containing sodium ions is produced by adding ammonium sulphate to an aqueous solution of sodium silicate.

13. A process as claimed in claim 11 in which the silica gel containing sodium ions is produced by the addition of sulphuric acid to an aqueous solution of sodium silicate, the amount of sulphuric acid employed being such that the final pH is at least 8.

14. A catalyst for the oxidation of sulphur dioxide to sulphur trioxide, which comprises freshly prepared silica gel impregnated with 6 to 9% by weight of vanadium pentoxide, 6 to 10% by weight of potassium oxide, and 1.5 to 6% by weight of sodium oxide.

15. A process for the oxidation of sulphur dioxide to sulphur trioxide which comprises the step of passing a gas mixture comprising sulphur dioxide and oxygen over a catalyst which has been produced by impregnating a freshly prepared silica gel containing alkali metal ions selected from the group consisting of sodium ions and potassium ions, with freshly precipitated vanadium pentoxide containing alkali metal ions selected from the group consisting of sodium and potassium ions, the resulting impregnated product containing both sodium and potassium ions, the product being dried, contacted with sulphuric acid, and thereafter calcined prior to use, the compositions and proportions of the reactants being chosen so that the finished catalyst comprises silica, 6 to 9% by weight of vanadium pentoxide, 6 to 10% by weight of potassium oxide and 1.5 to 6% by weight of sodium oxide, the catalyst being maintained at a temperature of 380° C. to 460° C.

16. A process for the production of catalysts suitable for the oxidation of sulphur dioxide to sulphur trioxide which comprises the steps of forming a silica gel from an aqueous sodium-potassium silicate solution by the action of ammonium sulphate, the said gel containing sodium and potassium ions and the pH at all stages of the formation of silica gel from the aqueous sodium-potassium silicate solution being at least 7.0 and, before appreciable syneresis has taken place, incorporating soluble vanadyl oxy salt in the said silica gel, substantially the whole product being dried by heating and thereafter more strongly heated, the compositions and the proportions of the reactants being chosen so that the finished catalyst comprises silica, 6 to 10% by weight of vanadium pentoxide, 6 to 15% by weight of potassium oxide, 1.5 to 6% by weight of sodium oxide and 10 to 30% by weight of sulphur trioxide.

17. A process as claimed in claim 16 wherein the compositions and proportions of the reactants are chosen so that the finished catalyst comprises 6 to 10% by weight of vanadium pentoxide, 9 to 12.5% by weight of potassium oxide, 4 to 6% by weight of sodium oxide and 15 to 25% by weight of sulphur trioxide.

18. A process as claimed in claim 16 wherein the pH at all stages of the formation of the silica gel from the aqueous sodium-potassium silicate solution is at least 8.0.

19. A process as claimed in claim 16 wherein the soluble vanadyl oxy salt is incorporated by adding it to the aqueous sodium-potassium silicate solution simultaneously with the ammonium sulphate.

20. A process as claimed in claim 16 wherein the vanadium containing silica gel is after drying mixed with sufficient aqueous sulphuric acid to incorporate between 10% and 25% of sulphuric acid calculated as $H_2SO_4$.

21. A process as claimed in claim 16 wherein the vanadium-containing silica gel receives the second heat treatment at a temperature in the range 200° C. to 575° C.

22. A process as claimed in claim 16 wherein the second heat treatment comprises calcination at a temperature in the range 500° C. to 575° C.

23. A process as claimed in claim 16 wherein there is incorporated into the catalyst additional silica up to 20% of that introduced from the aqueous sodium-potassium silicate solution, the additional silica being in the form of kieselguhr and being incorporated by adding it to the aqueous sodium-potassium silicate solution before the gelling stage.

24. A catalyst suitable for the oxidation of sulphur dioxide to sulphur trioxide obtained by a process as claimed in claim 16.

References Cited by the Examiner
UNITED STATES PATENTS

| | | | |
|---|---|---|---|
| Re. 18,380 | 3/32 | Jaeger | 23—175 |
| 1,371,004 | 3/21 | Slama | 23—175 |
| 1,687,919 | 10/28 | Yablick | 23—182 |
| 1,715,439 | 6/29 | Van Nes | 23—182 |
| 1,887,978 | 11/32 | Joseph | 23—175 |
| 1,941,427 | 12/33 | Beardsley | 23—176 |
| 2,027,316 | 1/36 | Johnson | 252—456 X |
| 2,114,123 | 4/38 | Heuser | 23—182 |
| 2,799,560 | 7/57 | Davis | 23—176 |

MAURICE A. BRINDISI, *Primary Examiner.*